UNITED STATES PATENT OFFICE.

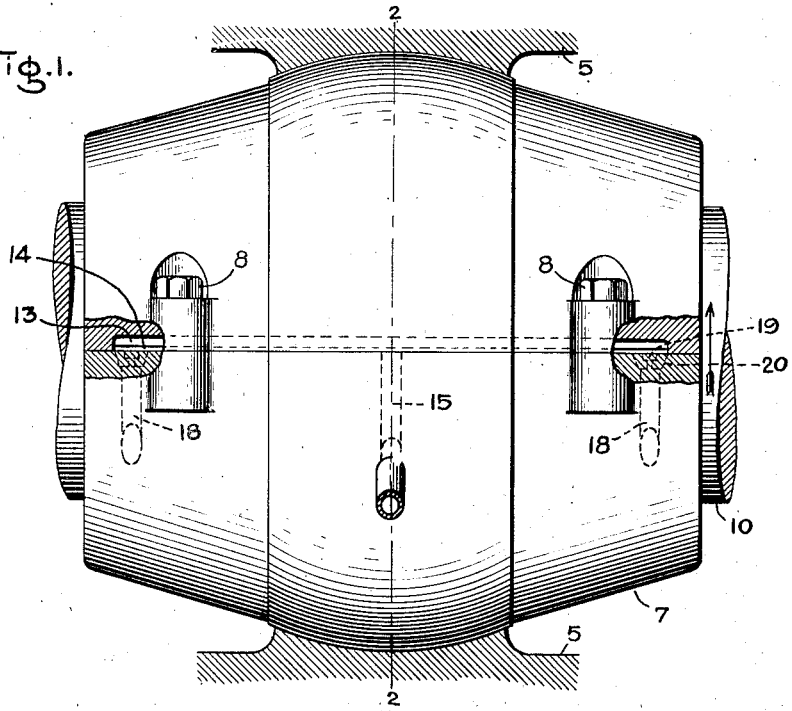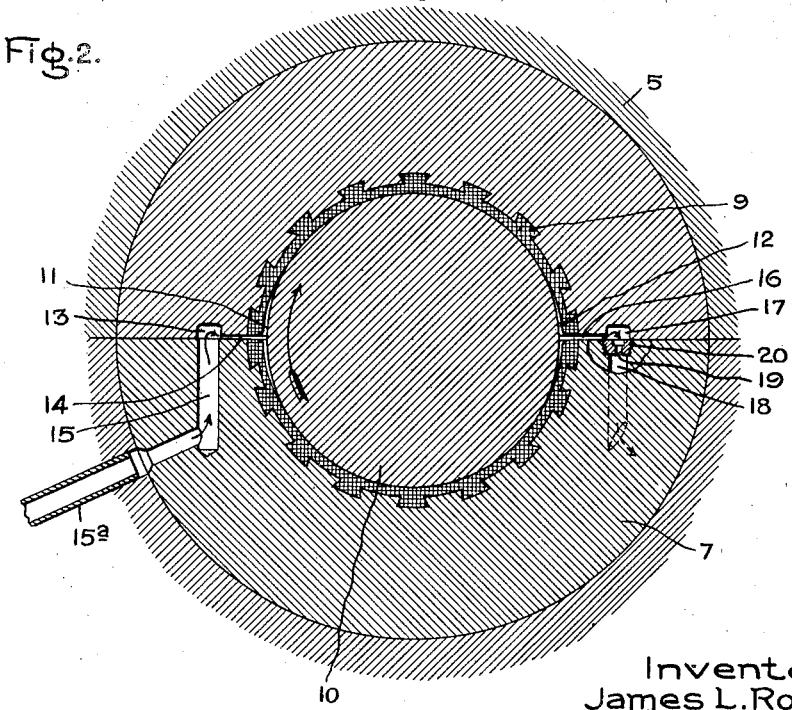

JAMES L. ROBERTS, OF SCHENECTADY, NEW YORK, ASSIGNOR TO GENERAL ELECTRIC COMPANY, A CORPORATION OF NEW YORK.

BEARING AND METHOD OF LUBRICATING SAME.

1,378,559. Specification of Letters Patent. Patented May 17, 1921.

Application filed May 1, 1919. Serial No. 293,900.

*To all whom it may concern:*

Be it known that I, JAMES L. ROBERTS, a citizen of the United States, residing at Schenectady, county of Schenectady, State of New York, have invented certain new and useful Improvements in Bearings and Methods of Lubricating Same, of which the following is a specification.

The present invention relates to bearings for rotating shafts, and has for its object to provide an improved structure and arrangement in a bearing and an improved method for lubricating the same.

For a consideration of what I believe to be novel and my invention, attention is directed to the accompanying description and the claims appended thereto.

In the drawing, Figure 1 is a side elevation of a bearing embodying my invention and Fig. 2 is a section taken on line 2—2, Fig. 1.

Referring to the drawing, 5 indicates an annular support having a spherical seat on which rests a pillow block 7, the same having an outer spherical surface. The pillow block 7 is split horizontally to form upper and lower halves which are connected together by bolts 8 and the respective halves are provided with linings 9 of suitable bearing material on which the shaft 10 runs. A bearing structure as just described may be taken as typical of bearing structures in general.

Now, according to my invention, to lubricate the bearing, I feed lubricant to the bearing surface along substantially its horizontal axis and on the side of the bearing at which the direction of movement of the shaft is upward. With this arrangement, the shaft acts as a pump to pump lubricant over the top of the bearing surface and to build up a pressure on the side of the shaft opposite to that at which the lubricant enters so as to feed lubricant down to the lower half of the bearing. In the drawing the direction of rotation of shaft 10 is indicated by the arrows marked thereon and accordingly in Fig. 2 the lubricant is fed to the bearing on the left hand side and the excess is discharged on the right hand side. On opposite sides of the shaft the bearing lining is cut back to provide lubricant spaces or chambers 11 and 12 respectively which extend throughout substantially the width of the bearing terminating just short of the ends thereof. Lubricant is fed to the chamber 11 from admission channel 13 which extends throughout substantially the entire length of the bearing and is connected to chamber 11 by a passage 14 which may be of the same length as channel 13. The chambers 11 and 12, channel 13 and passage 14 are made to terminate short of the bearing ends in order to cut down to a minimum the leakage or spill of lubricant at the ends of the bearing. Connected with channel 13 is a passage 15 which at its outer end is connected with a pipe 15$^a$ which leads from a suitable supply of lubricant. For example pipe 15$^a$ may be connected with a reservoir of lubricant, or it may be the discharge pipe of a suitable lubricant pump which may be operated from shaft 10 or otherwise. The chamber 12 is connected by a passage 16 to a discharge channel 17 similar to admission channel 13. Passage 16 and channel 17 both extend substantially the length of the bearing, terminating just short of the ends of the bearing. Leading from discharge channel 17 are two discharge passages 18 which may connect at their outer ends with suitable overflow receptacles or pipes. The admission openings from channels 17 to discharge passages 18 are in the form of small orifices 19 formed in plugs 20 and are of such size as to restrict the outflow so as to cause a desired amount of pressure to build up in lubricant chamber 12.

When the shaft is running lubricant is supplied through pipe 15$^a$ and passage 15 to channel 13 from which it is fed through passage 14 to the bearing. Channel 13 will be maintained full of lubricant as will also the lubricant space or chamber 11. The rotation of shaft 10 will carry lubricant from space or chamber 11 up over the top of the shaft and down into lubricant space or chamber 12, the shaft acting somewhat after the manner of a pump as I have found from tests that the shaft is capable of creating considerable suction in this manner and of pumping over a large volume of lubricant. The lubricant pumped over by shaft 10 is deposited in lubricant space or chamber 12 and the orifices 20 are of such area that the discharge of lubricant from channel 17 is restricted to the extent necessary to cause the desired amount of pressure to be built up in chamber 12. From chamber 12 lubricant feeds down to the lower half of the bearing. The excess of lubricant is continuously discharged through passages 18.

A circulation of lubricant through a bearing is desirable not only for reducing wear and friction but also for cooling purposes and I have found that with my improved arrangement I can put much more lubricant through a bearing than has been possible heretofore. I find that I can cause sufficient lubricant to flow through the bearing to effectively cool it by means of lubricant alone, thus doing away with water cooling coils, a thing which is always undesirable because it not only adds complications to a bearing structure and increases the cost of manufacture, but also because it keeps ever present the likelihood that water may become mixed with the lubricant.

My improved lubricating structure and method has the further advantage that I am enabled to successfully lubricate a bearing by the use of lubricant supplied under a very much lower pressure than heretofore which means that the apparatus is much simpler and that the leakage or spill at the ends of the bearing is very much reduced. As a numerical example of this, I have found where under existing methods of lubricating a pressure of as high as 55 pounds was required in space 16 in order to force lubricant around the upper half of the bearing in opposition to the movement of the shaft, by my present method I need build up in space 16 a pressure of only about 5 pounds, and that the lubricant may be supplied to channel 13 at a comparatively low pressure.

In accordance with the provisions of the patent statutes, I have described the principle of operation of my invention together with the apparatus which I now consider to represent the best embodiment thereof; but I desire to have it understood that the apparatus shown is only illustrative, and that the invention can be carried out by other means.

What I claim as new and desire to secure by Letters Patent of the United States, is:

1. The combination with a shaft and a bearing on which it rotates, of means for feeding lubricant to the bearing surface on the side of the bearing at which the direction of movement of the shaft is upward, and means for discharging lubricant from the other side of the shaft, whereby said shaft acts as a pump to pump lubricant through the bearing to lubricate and cool it.

2. In combination, a shaft and a bearing therefor, said bearing having a passage therein for feeding lubricant to the bearing surface on the side thereof at which the movement of the shaft is upward, and passages on the opposite side of the shaft for conveying excess lubricant away from the bearing surface, whereby said shaft acts as a pump to pump lubricant through the bearing to lubricate and cool it.

3. In combination, a shaft and a bearing therefor, said bearing having a passage therein for feeding lubricant to the bearing surface on the side thereof at which the movement of the shaft is upward, and a passage of restricted area for conveying excess lubricant away from the bearings.

4. The combination with a shaft and a bearing, there being a lubricant chamber between the shaft and bearing on each side of the bearing, of conduit means for supplying lubricant to the chamber on the side of the bearing where the shaft moves upward, and conduit means for conveying lubricant away from the other chamber, whereby said shaft acts as a pump to pump lubricant through the bearing to lubricate and cool it.

5. The combination with a shaft and a bearing on which it rotates, of means for feeding lubricant to the bearing surface on the side of the bearing at which the direction of movement is upward, and means of restricted area for discharging lubricant from the other side of the shaft, said shaft acting as a pump to assist the flow of lubricant through the bearing to lubricate and cool it.

6. The method of lubricating and cooling a shaft bearing which comprises supplying the lubricant to the shaft bearing on the side of the bearing at which the shaft is turning toward the top of the bearing, and withdrawing the lubricant from the opposite side of the bearing.

7. A bearing of the type wherein lubricant is supplied in quantities for lubricating and cooling it, the lubricant being supplied on one side of the bearing and discharged on the other side, characterized by the fact that the lubricant is supplied to the bearing on the side at which the rotation of the shaft is upward.

In witness whereof, I have hereunto set my hand this 30th day of April, 1919.

JAMES L. ROBERTS.